United States Patent

Villiers-Fisher

[15] 3,650,692

[45] Mar. 21, 1972

[54] REMOVAL OF SULFUR DIOXIDE FROM WASTE GASES

[72] Inventor: John F. Villiers-Fisher, Kendall Park, N.J.

[73] Assignee: Chemical Construction Corporation, New York, N.Y.

[22] Filed: Dec. 9, 1969

[21] Appl. No.: 883,485

[52] U.S. Cl. .............................................23/178, 23/2 SQ
[51] Int. Cl. ...................................C01b 17/60, C01b 17/56
[58] Field of Search .........................................23/2, 178, 201

[56] References Cited

UNITED STATES PATENTS

| | | | |
|---|---|---|---|
| 2,161,056 | 6/1939 | Johnstone et al. | 23/178 S |
| 2,922,735 | 1/1960 | Johnstone | 23/178 R |
| 3,273,961 | 9/1966 | Rogers et al. | 23/2 X |

OTHER PUBLICATIONS

Pinaev, Chem. Abs., Vol. 59, p. 13621 (d) (1963).

*Primary Examiner*—Oscar R. Vertiz
*Assistant Examiner*—Charles B. Rodman
*Attorney*—J. L. Chaboty

[57] ABSTRACT

Waste gases containing sulfur dioxide and entrained solids such as fly ash are scrubbed with an aqueous magnesium oxide-sulfite slurry, which dissolves sulfur dioxide to form further magnesium sulfite and also scrubs entrained solids from the gas stream into the aqueous slurry. Magnesium oxide is regenerated by calcining a portion of the slurry or the solids component of a slurry portion, which generates a dust-laden off-gas rich in sulfur dioxide. Buildup of entrained solids such as fly ash in the system is effectively prevented by scrubbing the dust-laden off-gas with an aqueous solution, to which a portion of the solids component of the slurry or regenerated magnesium oxide may be added. The scrubbing step solubilizes magnesium compounds as magnesium bisulfite, due to high sulfur dioxide concentration, and the resulting aqueous magnesium bisulfite solution is filtered to remove residual solids such as fly ash. Magnesium oxide is added to the residual liquid phase to precipitate solid magnesium sulfite, which is filtered from the final residual liquid phase. A portion of this final liquid phase may be discarded to prevent buildup of alkali sulfates or the like, and the balance of the final liquid phase is recycled to the off-gas scrubbing step. The precipitated solid magnesium sulfite is recycled to the calcining step.

14 Claims, 1 Drawing Figure

Patented March 21, 1972
3,650,692
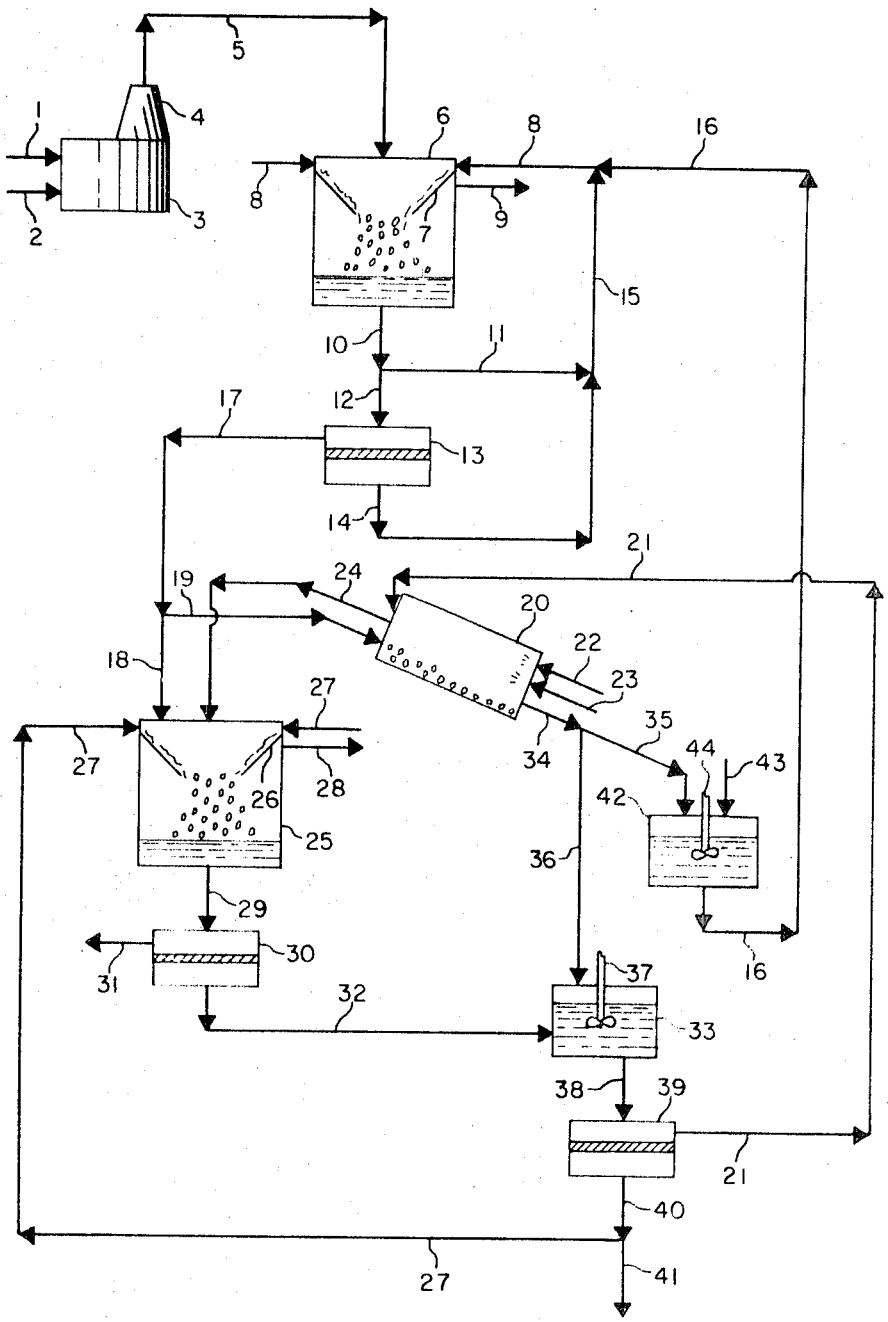
JOHN F VILLIERS-FISHER
INVENTOR.
BY ) . 7 . ( . l . . 7 .
AGENT

REMOVAL OF SULFUR DIOXIDE FROM WASTE GASES

BACKGROUND OF THE INVENTION

1. Field of the Invention

The invention relates to the removal and recovery of sulfur dioxide and entrained solid particles such as fly ash from waste gas streams, in order to prevent air pollution and to economically and efficiently recover a valuable sulfur-containing product. The invention is typically applicable to the waste flue gas generated by the combustion of a sulfur-containing fuel, such as the flue gas discharged by a coal-burning steam power plant. The process of the present invention may also be applied to the processing of the flue gas generated by the combustion of liquor, which is produced as a byproduct in the processing of wood pulp, such as in the magnesia-base pulp digestion process.

2. Description of the Prior Art

At present, waste gases such as flue gases leaving a coal or oil-fired steam power plant or the like are a major source of air pollution, due to the presence of sulfur dioxide and fly ash in such flue gases. The processing of waste gas streams to remove and recover sulfur dioxide is described in U.S. Pat. Nos. 1,212,199; 2,086,379 and 2,090,142. Disclosures relative to processes involving sulfite solutions or slurries include U.S. Pat. Nos. 1,484,818; 2,210,405; 2,351,780; 2,375,786; 2,413,321; 2,572,929; 3,085,858 and 3,273,961 and commonly owned U.S. patent applications Ser. Nos. 737,186 filed June 14, 1968 and issued as U.S. Pat. No. 3,617,212 on Nov. 2, 1971 and 772,547 filed Nov. 1, 1968 and issued as U.S. Pat. No. 3,577,219 on May 4, 1971. Technology relative to the processing of sulfite solutions in wood pulp manufacture is disclosed in U.S. Pat. Nos. 716,330; 830,996; 1,097,781; 1,378,617; 1,499,898; 1,549,189, 1,637,353; 1,828,690; 2,042,477; 2,042,478; 2,047,627; 2,141,886; 2,147,161; 2,147,162; 2,190,612, 2,637,627 and 2,872,289. In instances when a waste gas containing entrained solids such as fly ash is scrubbed with a recirculating slurry, it is general prior art practice to bleed off and discard a portion of the circulating slurry in order to prevent the buildup of solid fly ash concentration in the circulating slurry above an optimum level. Makeup of fresh slurry free of fly ash is added to the circulating slurry, however this procedure is costly due to the net loss of active slurry components such as magnesium oxide and magnesium sulfite in the discard.

SUMMARY OF THE INVENTION

In the present invention, accumulation or buildup of entrained solids such as fly ash in a recirculating aqueous magnesium oxide-sulfite slurry, which is employed to scrub sulfur dioxide and entrained solid particles from a waste gas stream, is effectively prevented. A portion of the circulating slurry is drawn off and the solids component of the slurry is calcined to regenerate magnesium oxide and generate a dust-laden off-gas rich in sulfur dioxide. The off-gas contains dust particles which generally consist of a mixture of magnesium oxide, magnesium sulfite and inert solids such as fly ash. The off-gas is scrubbed with an aqueous solution, to which a portion of the magnesium oxide-sulfite slurry or a portion of the generated magnesium oxide may be added. In any case, the aqueous scrubbing solution attains a high concentration of dissolved sulfur dioxide in contact with the off-gas, and as a result the magnesium compounds are solubilized and dissolve in the aqueous solution as magnesium bisulfite, leaving the inert solids such as fly ash as the only remaining solid component. The resulting aqueous solution is filtered to remove inert solids which are discarded and thus removed from the system, and magnesium oxide is added to the clear liquid phase as filtrate, to convert dissolved magnesium bisulfite to magnesium sulfite, which precipitates from solution as solid crystals. The resulting slurry is filtered to recover solid magnesium sulfite which is recycled to calcination. A portion of the final residual solution remaining after magnesium sulfite removal may be discarded, to eliminate alkali sulfates and the like from the system, and the balance of the final residual solution is recycled to the scrubbing of the dust-laden calcination off-gas. A unitary system and combination of process steps is thus provided for the removal of sulfur dioxide and entrained solids from a waste gas stream by scrubbing with an aqueous magnesium oxide-sulfite slurry, in which buildup in the circulating slurry of excessive concentration of inert solids derived from the waste gas in effectively prevented.

The principal advantage of the present invention is that entrained solids such as fly ash are removed from the circulating slurry system in an improved and more efficient manner, when a circulating aqueous magnesium oxide-sulfite slurry is employed to scrub sulfur dioxide from a waste gas stream such as flue gas which also contains entrained solids such as fly ash. Another advantage is that entrained solids such as fly ash are purged from the system without the loss of valuable magnesium salts. A further advantage is that the system of the present invention includes the scrubbing of the dust-laden off-gas rich in sulfur dioxide produced by calcination, and thus a scrubbed and substantially solids-free off-gas rich in sulfur dioxide is produced by the present process, and the scrubbed off-gas may be readily processed to produce pure liquid sulfur dioxide by refrigeration or the like, or the scrubbed off-gas may be passed to a sulfuric acid plant and employed as a feedstock in sulfuric acid production. An advantage is that the system also provides for a liquid solution bleed from the system, after solid magnesium sulfite precipitation and removal, and this liquid solution bleed and discard effectively removes alkali sulfates and the like from the system without loss of valuable magnesium salts.

It is an object of the present invention to remove sulfur dioxide and entrained solid particles from waste gas streams in an improved manner.

Another object is to prevent buildup of excessive concentrations of inert solids in a circulating aqueous magnesium oxide-sulfite slurry employed to scrub sulfur dioxide and entrained solids from a waste gas stream.

A further object is to purge fly ash to an improved manner from a recirculating aqueous magnesium oxide-sulfite slurry employed to scrub flue gas.

An additional object is to separate entrained inert solids from an aqueous magnesium oxide-sulfite slurry without the loss of valuable magnesium salts.

An object is to provide an improved combination process for scrubbing a waste gas containing sulfur dioxide and entrained solids with an aqueous magnesium oxide-sulfite slurry, regenerating a portion of the slurry by calcination, and solubilizing the magnesium salts in a portion of the slurry in order to remove entrained inert solids from the system.

An object is to prevent air pollution in an improved manner, by scrubbing sulfur dioxide and entrained solids from waste gases such as flue gas prior to atmospheric discharge.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented.

Sulfur-containing fuel stream 1, consisting usually of coal or a fluid hydrocarbon fuel such as Bunker C residual oil, is passed together with combustion air stream 2 into the furnace 3, which is typically the steam boiler of a steam power plant. Stack 4 extends from furnace 3, and discharges flue gas stream 5, which typically contains in the range of about 0.1 to 2 percent sulfur dioxide content by volume, together with entrained solid fly ash particles.

Stream 5 is passed into a suitable scrubbing device for contact with a circulating aqueous magnesium oxide-sulfite slurry, which device in this embodiment of the invention consists of the venturi contactor 6. Unit 6 is provided with an internal inverted frustoconical baffle 7, and the flue gas stream is passed downwards into unit 6 and accelerated to high velocity by the convergence of baffle 7. An aqueous recirculating slurry stream 8 is passed into unit 6 above the baffle 7, and flows downwards on the upper surface of baffle 7. Stream 8 is an aqueous slurry containing solid particles of magnesium oxide, magnesium sulfite and fly ash, and stream 8 usually contains in the range of about 5 to 40 percent total solids content by weight. The downflowing slurry is projected by baffle 7 into the highly accelerated flue gas stream at and below the lower terminus of baffle 7, with resultant dispersion of the slurry into the gas stream and rapid attainment of gas-slurry equilibrium, with resultant absorption of most of the sulfur dioxide into the slurry causing formation of further magnesium sulfite. In addition, fly ash is scrubbed from the gas stream into the liquid phase of the slurry, and joins the slurry as an entrained inert solids component of the slurry. The resultant slurry of increased magnesium sulfite and fly ash content collects in the lower portion of unit 6, and the lower portion of unit 6 may in some cases consist of an elongated spray tower to provide greater gas-slurry contact time. In any case, the scrubbed flue gas is removed from unit 6 via stream 9, which may now be safely discharged to the atmosphere via a stack or the like without causing air pollution.

The aqueous slurry is removed from the bottom of unit 6 via stream 10, which is divided into recycle stream 11 and stream 12 which is processed for regeneration of magnesium oxide. Stream 12 usually consists of about 5 to 20 percent of stream 10, and slurry stream 12 is passed into a suitable device such as a filter or centrifuge for the separation of solid and liquid phases. Stream 12 thus passes into filter 13, and a clear aqueous liquid phase is withdrawn from unit 13 via stream 14, which is combined with stream 11 to form stream 15, which in turn is combined with recycle regenerated magnesium oxide in aqueous slurry stream 16 to form stream 8.

Returning to unit 13, a separated solids component containing magnesium oxide, magnesium sulfite and fly ash is removed via stream 17, which is divided into streams 18 and 19. Stream 18 is utilized in accordance with a preferred embodiment of the invention, as will appear infra, and stream 19 is processed to produce regenerated magnesium oxide and a gas stream rich in sulfur dioxide. Stream 19 is calcined at elevated temperature, by passing stream 19 into rotary kiln or calciner 20. A recycle solid magnesium sulfite stream 21 is also passed into unit 20, and a highly elevated temperature generally in the range of 400° to 1,000° C. is maintained within unit 20 by burning fuel stream 22 with combustion air stream 23 within unit 20. The solid feed streams 19 and 21 are roasted or calcined within unit 20, with resultant conversion of magnesium sulfite to magnesium oxide and evolution of a dust-laden gas stream 24 rich in sulfur dioxide, which is now processed in accordance with the present invention. Stream 24 typically contains in the range of about 5 to 25 percent sulfur dioxide content by volume, together with entrained solid dust particles generally consisting of magnesium oxide, magnesium sulfite and fly ash.

Stream 24 is passed into a suitable gas-liquid contact device, which preferably consists of venturi contactor 25 provided with the internal inverted frustoconical baffle 26. The downflowing hot gas stream 24 is accelerated to a high velocity within unit 25 by baffle 26, and aqueous liquid stream 27 and solids stream 18 are passed downwards on the inner surface of baffle 26, so that the resulting slurry is projected into the hot gas stream at the lower end of baffle 26 and rapid gas-slurry reaction and equilibrium is attained. The hot gas is thereby scrubbed with the liquid phase, so that the liquid phase attains a high concentration of sulfur dioxide, and magnesium compounds derived from stream 18 and from the dust component of stream 24 are solubilized and dissolved in the liquid phase as magnesium bisulfite, due to the high concentration of dissolved sulfur dioxide in the liquid phase collected in the bottom of unit 25. The resulting scrubbed gas phase in the lower part of unit 25, now at a reduced temperature typically in the range of 50° to 90° C. and substantially free of entrained dust particles, is removed from unit 25 via stream 28, which contains a substantial proportion of sulfur dioxide and which may now be processed to recover a valuable sulfur-containing product such as liquid sulfur dioxide, elemental sulfur, sulfuric acid or the like by known methods and procedure, not shown.

The aqueous liquid phase removed from the bottom of unit 25 via stream 29 now consists essentially of an aqueous magnesium bisulfite solution containing a minor proportion of dissolved sulfur dioxide. Stream 29 also contains an entrained solid particles phase consisting of solid fly ash derived from streams 18 and 24. Stream 29 is processed in a suitable filter or centrifuge to separate and remove the entrained solids phase and produce a clear liquid solution, by passing stream 29 into filter device 30. The separated solids phase stream 31 removed from unit 30 consists essentially of solid fly ash particles and stream 31 is passed to suitable waste disposal. The residual clear liquid phase stream 32 removed from unit 30 is passed into reactor 33 for processing to precipitate and recover magnesium values, as will appear infra.

Returning now to calciner unit 20, a calcined solids stream 34 is discharged from unit 20, and stream 34 consists essentially of a mixture of regenerated magnesium oxide and fly ash. A major portion of stream 34 passes via stream 35 to processing prior to recycle as makeup aqueous magnesium oxide slurry for flue gas scrubbing, as will appear infra. The balance of stream 34 passes via stream 36 into mixer-reactor 33, provided with stirrer 37, in which the magnesium oxide content of stream 36 reacts with the dissolved magnesium bisulfite of stream 32 to form solid magnesium sulfite, which precipitates in unit 33. The resulting slurry of magnesium sulfite crystals in aqueous liquor or solution is removed from unit 33 via stream 38, which is filtered or centrifuged in unit 39. The separated solids phase principally consisting of magnesium sulfite is removed from unit 39 via stream 21 which is recycled as described supra. The clear aqueous liquid phase or solution removed from unit 39 via stream 40 is now of diminished dissolved magnesium ion concentration, and in most cases stream 40 will be substantially free of magnesium values. Stream 40 is divided into purge stream 41, which is discharged to waste in order to remove alkali sulfates and the like from the system, and recycle stream 27 which is recycled to unit 25 as described supra. Makeup water may be added to stream 27 as required.

Returning to unit 20, stream 35 obtained as a major portion of discharge solids stream 34 is passed to mixer 42 and slurried with water stream 43, with stirrer or agitator 44 being provided to produce a uniform aqueous slurry. The regenerated magnesium oxide-fly ash slurry product is removed from unit 42 via stream 16, which is recycled to flue gas scrubbing as described supra.

Numerous alternatives within the scope of the present invention will occur to those skilled in the art. The ranges of process variables such as concentrations or temperatures constitute preferred embodiments of the invention for optimum utilization of the process concepts, and the invention may be practiced outside of these ranges in suitable instances. The invention is generally applicable to the scrubbing of any waste gas stream containing sulfur dioxide and entrained solid particles, thus stream 5 may be derived from other sources such as combustion of black liquor derived from wood pulp processing, or like sources. A portion or all of stream 14 may be passed into unit 42, instead of or in addition to stream 43. Stream 18 may be omitted in some cases, such as when a high concentration of entrained dust is present in stream 24, in which case all of stream 17 will be processed via stream 19. A portion of stream 34 may be passed into unit 25 instead of or in addition to stream 18, to dissolve magnesium oxide as magnesium bisulfite and eliminate additional fly ash from the circuit via stream 31. This portion of stream 34, as well as stream 18, may alternatively be slurried with stream 27 in a suitable mixer or slurrying device, with the resulting aqueous slurry being passed into unit 25 above and adjacent to the upper end of baffle 26. Loss of a small amount of magnesium values from the system, as for example in stream 41, may be compensated for by adding fresh makeup magnesium oxide, preferably into unit 42.

Examples of industrial application of the process of the present invention will now be described.

EXAMPLE I.

Venezuelan fuel oils contain 2.5 to 3 percent sulfur and 0.1 to 0.2 percent ash. The ash is mostly a vanadium oxide-alkali metal sulfate mix. The vanadium oxide solubilities are slight. Assuming that vanadium oxides are inert and that the prior art practice of removing the ash from the circuit as a bleed of the recycling solids or slurry is followed, the following costs are incurred as a consequence of the ash buildup in the recycle, given the following basis:

Non-recoverable heat during calcining the sulfite-natural gas at $0.35/MCF.
Transportation costs at $1.25/ton solids round trip.
Magnesium oxide loss in bleed stream at $0.025/lb. MgO.
Sulfur in fuel oil: 2.7 percent
Ash in fuel oil: 0.1 percent

| Stream Number | Temp., °C. | Content of component, kg./min. | | | | | |
|---|---|---|---|---|---|---|---|
| | | Ash | Magnesium sulfite | Magnesium bisulfite | Magnesium oxide | Sulfur dioxide | Water |
| 17 | 49 | 13 | 89 | | | | |
| 18 | 49 | 0.36 | 2.5 | | | | |
| 24 | 314 | 0.14 | 1.0 | | | 26.3 | |
| 28 | 49 | | | | | 24.2 | |
| 29 | 49 | 0.5 | | 6.2 | | | 50 |
| 31 | 42 | 0.5 | | | | | 0.5 |
| 32 | 42 | | | 6.2 | | | *51.5 |
| 36 | 314 | 0.7 | | | 1.4 | | |
| 38 | 42 | 0.7 | 7.0 | | | | 51.5 |
| 40 | 49 | | | | | | 50.8 |
| 21 | 49 | 0.7 | | | | | 0.7 |

*Water wash of filtered ash, not shown.

A minimum total cost of about $3.39 per ton of sulfur is thus obtained at about 50 percent ash content in the recycle MgO, when the prior art practice of bleeding off and discarding a portion of the recycle solids is followed. The costs are roughly linear with the ash/sulfur ratio. A system of 0.2 percent ash to 3 percent sulfur would incur ash disposal penalties of about $8.50/ton of sulfur.

In accordance with the present invention, it was determined that magnesium sulfite dissolves in aqueous solution in the presence of excess sulfur dioxide to form magnesium bisulfite. With sulfur dioxide gas present at 15 percent by volume concentration, solubility is on the order of 10 grams per 100 grams water. Vanadium oxides reduce to the insoluble $V_2O_4$ in aqueous sulfur dioxide. As shown supra for the particular system investigated, bleed down of magnesium oxide plus ash costs about $3.40 per ton of sulfur, while the solubilization process of the present invention costs only about $1.40 to $2.00 per ton of sulfur.

EXAMPLE II.

A power plant burns 1,000 kg. of crude oil per minute. The oil contains 2.7 percent sulfur which is converted almost entirely to sulfur dioxide. The oil also contains 0.1 percent insoluble ash. About 50 percent of the ash is collected in the low draft scrubber. Higher efficiencies can be obtained at the expense of increased power consumption.

About 90 percent of the sulfur dioxide is removed from the gas as magnesium sulfite hydrate, which insoluble compound along with the ash is separated from stream 12 and is sent via stream 17 to the calciner. In many cases the sulfite is dehydrated before calcination, but this step can be omitted.

The steady state ash level is assumed to be the equivalent of 34 percent ash, 66 percent magnesium oxide. The particular level depends on local economics. Following is a typical material balance around the calciner and ash removal process.

All compositions and flow rates are expressed in kg./minute.

COSTS AT VARYING RECYCLE ASH CONCENTRATIONS

| Ash in recycle MgO, wt. percent | 17 | 13 | 50 | 67 |
|---|---|---|---|---|
| Heat losses, $/ton sulfur | 0.04 | 0.08 | 0.13 | 0.21 |
| Transportation, $/ton sulfur | 0.31 | 0.80 | 1.56 | 2.42 |
| MgO makeup, $/ton sulfur | 9.0 | 3.5 | 1.7 | 1.1 |
| Total | 9.35 | 4.38 | 3.39 | 3.73 |

What is claimed is:

1. In a process for removing sulfur dioxide and entrained solid particles from a waste gas stream in which the waste gas stream is scrubbed with a circulating aqueous magnesium oxide-sulfite slurry to dissolve sulfur dioxide and thereby form further magnesium sulfite, and to remove solid particles from the waste gas into the aqueous slurry, a portion of the circulating slurry is drawn off, and the solids component of said slurry portion is separately processed by heating to produce a dust-laden gas stream and regenerated solid magnesium oxide, said dust-laden gas stream containing sulfur dioxide, solid particles of magnesium compounds and inert solids derived from said waste gas stream, the improvement which comprises:

a. scrubbing said dust-laden gas stream with an aqueous scrubbing solution, whereby dust and sulfur dioxide are entrained in said aqueous solution, and the magnesium compounds component of said entrained dust is dissolved in said aqueous solution as magnesium bisulfite, b. separating inert solids from the resulting aqueous solution containing dissolved magnesium bisulfite, c. adding magnesium oxide to the solids-free resulting aqueous solution, whereby dissolved magnesium bisulfite is converted to solid magnesium sulfite, d. removing said solid magnesium sulfite from the residual aqueous solution, and e. calcining said solid magnesium sulfite together with said solids component of said slurry portion to produce regenerated magnesium oxide and a dust-laden gas stream rich in sulfur dioxide.

2. The process of claim 1, in which said waste gas stream is a flue gas derived from the combustion of a sulfur-containing fuel, and said entrained solid particles consist of fly ash.

3. The process of claim 1, in which an additional portion of the circulating magnesium oxide-sulfite slurry is drawn off, and the solids component of said additional slurry portion is added to said aqueous solution, whereby the magnesium compounds contained in said additional portion are converted to magnesium bisulfite during the scrubbing of said dust-laden gas stream, and the inert solids within said additional portion and derived from said waste gas stream are separated from said resulting aqueous solution containing dissolved magnesium bisulfite.

4. The process of claim 1, in which said regenerated solid magnesium oxide contains inert solid particles derived from said waste gas stream, and a portion of said regenerated solid magnesium oxide is added to said aqueous solution, whereby the magnesium oxide contained in said portion is converted to magnesium bisulfite during the scrubbing of said dust-laden gas stream and the inert solid particles contained in said portion and derived from said waste gas stream are separated from said resulting aqueous solution containing dissolved magnesium bisulfite.

5. The process of claim 1, in which at least a portion of said aqueous scrubbing solution of step (a) consists of said residual aqueous solution.

6. The process of claim 1, in which water is added to said regenerated solid magnesium oxide to form an aqueous slurry, and said aqueous slurry of magnesium oxide is added to said circulating aqueous magnesium oxide-sulfite slurry to provide additional magnesium oxide in said circulating slurry.

7. The process of claim 1, in which said magnesium oxide added to the solids-free resulting aqueous solution to solid convert dissolved magnesium bisulfite to magnesium sulfite consists of a portion of said regenerated solid magnesium oxide.

8. A process for the removal of sulfur dioxide and entrained solid particles from a waste gas stream which comprises:
  a. scrubbing a waste gas stream containing sulfur dioxide and entrained solid particles with an aqueous slurry containing solid magnesium oxide and magnesium sulfite, whereby sulfur dioxide is dissolved in said aqueous slurry to form further magnesium sulfite and solid particles are scrubbed from said waste gas stream into said slurry,
  b. separating the resulting aqueous slurry from the scrubbed waste gas stream,
  c. dividing said resulting aqueous slurry into a first portion and a second portion,
  d. adding makeup magnesium oxide to the first portion of said resulting aqueous slurry,
  e. recycling the combined aqueous slurry formed by step (d) to step (a),
  f. calcining at least a portion of the solids component of the second portion of said resulting aqueous slurry, said solids component containing magnesium oxide, magnesium sulfite and solid particles derived from said waste gas stream, whereby a gas stream containing sulfur dioxide and dust is formed and a regenerated solids stream containing magnesium oxide is produced, said dust principally consisting of magnesium oxide, magnesium sulfite and inert solid particles derived from said waste gas stream,
  g. contacting the dust-laden gas stream containing sulfur dioxide formed by step (f) with an aqueous scrubbing solution, whereby sulfur dioxide is dissolved in said aqueous solution, magnesium-containing components of said dust are converted to magnesium bisulfite and thereby dissolved in said aqueous solution, and inert solid particles are entrained in said aqueous solution,
  h. separating the solids component consisting of inert solid particles from the aqueous solution formed by step (g),
  i. adding magnesium oxide to the residual solids-free aqueous solution formed by step (h), whereby dissolved magnesium bisulfite is converted to solid magnesium sulfite,
  j. separating the solid magnesium sulfite formed by step (i) from the residual liquid phase, and
  k. recycling the separated solid magnesium sulfite to calcining in step (f).

9. The process of claim 8, in which said waste gas stream is a flue gas derived from the combustion of a sulfur-containing fuel, and said entrained solid particles consist of fly ash.

10. The process of claim 8, in which said second portion of said resulting aqueous scrubbing slurry is divided into a major portion and a minor portion, the major portion is processed according to step (f), and the solids component of said minor portion is added to said aqueous solution during step (g), whereby the magnesium compounds contained in the solids component of said minor portion are converted to magnesium bisulfite during the contacting of said dust-laden gas stream with said aqueous solution according to step (g), and the inert solids within the solids component of said minor portion and derived from said waste gas stream are separated from said aqueous solution according to step (h).

11. The process of claim 8, in which said regenerated solids stream containing magnesium oxide produced by step (f) also contains inert solid particles derived from said waste gas stream, and a portion of said regenerated solids stream is added to said aqueous scrubbing solution during step (g), whereby the magnesium oxide contained in said portion is converted to magnesium bisulfite during the contacting of said dust-laden gas stream with said aqueous scrubbing solution during step (g), and the inert solid particles contained in said portion and derived from said waste gas stream are separated from said aqueous solution according to step (h).

12. The process of claim 8, in which at least a portion of said aqueous scrubbing solution of step (g) consists of said residual liquid phase separated in step (j).

13. The process of claim 8, in which water is added to said regenerated solids stream containing magnesium oxide to form an aqueous slurry, and said aqueous slurry of magnesium oxide is added to said first portion of said resulting aqueous slurry according to step (d).

14. The process of claim 8, in which said magnesium oxide added to the residual solids-free aqueous solution according to step (i) to convert magnesium bisulfite to magnesium sulfite consists of a portion of the regenerated solids stream containing magnesium oxide formed by step (f).

* * * * *

UNITED STATES PATENT OFFICE
CERTIFICATE OF CORRECTION

Patent No. 3650692　　　　　　　　　　Dated 21 March 1972

Inventor(s) John F. Villiers-Fisher

It is certified that error appears in the above-identified patent and that said Letters Patent are hereby corrected as shown below:

Col. 1 line 60, read "regenerated" instead of "generated".

Col. 2 line 8, read "is" instead of "in". Also line 40, read "in" instead of the second "to".

Col. 6 line 4, read "34" instead of "13".

Claim 7 line 2 (Col. 7 line 12) delete "solid". Also line 3, read "solid" after "to".

Claim 10 line 2 (Col. 8 line 14) delete "scrubbing". Also line 5, read "scrubbing" after "aqueous". Also line 21, read "scrubbing" after "aqueous".

Signed and sealed this 4th day of July 1972.

(SEAL)
Attest:

EDWARD M. FLETCHER, JR.　　　　　　　　ROBERT GOTTSCHALK
Attesting Officer　　　　　　　　　　　Commissioner of Patents